United States Patent
Mathews, Jr. et al.

(10) Patent No.: US 6,586,712 B1
(45) Date of Patent: Jul. 1, 2003

(54) APPARATUS FOR LIMITING TEMPERATURE

(75) Inventors: Harry Kirk Mathews, Jr., Clifton Park, NY (US); John Stanley Glaser, Niskayuna, NY (US); Austars Raymond Schnore, Jr., Scotia, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 09/683,310

(22) Filed: Dec. 12, 2001

(51) Int. Cl.[7] .................................. H05B 1/02

(52) U.S. Cl. ................ 219/505; 219/497; 219/499; 219/413; 219/481

(58) Field of Search ................ 219/501, 505, 219/497, 499, 494, 481, 413, 412, 414; 307/117; 236/68 B, 91 R, 1 R

(56) References Cited

U.S. PATENT DOCUMENTS

| | | | | |
|---|---|---|---|---|
| 3,632,985 A | * | 1/1972 | Bare et al. | 219/413 |
| 3,732,432 A | * | 5/1973 | Brouneus | 219/499 |
| 4,089,462 A | * | 5/1978 | Bradford | 236/68 B |
| 5,270,520 A | * | 12/1993 | Barzilai et al. | 219/501 |
| 5,304,781 A | * | 4/1994 | Stalsberg | 219/501 |
| 6,100,510 A | * | 8/2000 | Chen et al. | 219/497 |
| 6,285,012 B1 | | 9/2001 | Connolly et al. | |

* cited by examiner

*Primary Examiner*—Mark Paschall
(74) *Attorney, Agent, or Firm*—Patrick K. Patnode; Christian G. Cabou

(57) ABSTRACT

A temperature limiting user interface comprises a potentiometer for providing a reference signal to an electronic apparatus, the electronic apparatus being adapted to generate heat as a function of the reference signal; and a temperature-sensitive impedance, thermally coupled to the electronic apparatus so as to receive at least a portion of the heat, and electrically coupled to the potentiometer so as to alter the reference signal as a function of temperature.

10 Claims, 5 Drawing Sheets

APPARATUS FOR LIMITING TEMPERATURE

BACKGROUND OF INVENTION

The present invention relates generally to the field of limiting temperature in electronic apparatus and more specifically to the use of a temperature-sensitive impedance to alter a potentiometer set point signal.

In a wide variety of applications, a potentiometer is used to provide a set point signal to an electronic apparatus. The set point signal is first among a series of signals and functional elements constituting a primary control path through the electronic apparatus. In response to the primary control path signals, the electronic apparatus performs a primary function. Performance of the primary function typically generates heat, either as an intended product, as in, for example, a cooking appliance or other heating application, or as an unintended by-product owing to electrical power dissipation in component resistances. To curtail an excessive, potentially damaging temperature rise, either inside or outside the electronic apparatus itself, at least a portion of the electronic apparatus is conventionally devoted to a temperature limiting function often realized by closing a temperature feedback loop through a secondary control path. When the secondary control path includes an unstable compensator, such as, for example, an integrator, an additional anti-windup function is typically performed through a tertiary control path.

The three-path temperature limiting scheme has numerous benefits: flexibility in choice of temperature limit; the possibility of having temperature limit dynamics different from primary function dynamics; the ability to use unstable temperature compensators providing higher performance, in some cases, than alternative stable compensators; and an explicit classical control structure facilitating analysis and prediction of dynamic behavior.

However, in some applications, such as, for example, in some cooking appliances, it is economically advantageous to sacrifice some of the abovementioned benefits in order to reduce the overall cost and complexity of the electronic apparatus. An opportunity exists, therefore, to eliminate the secondary and tertiary control paths by modifying the primary control path to perform both the primary function and the temperature limiting function.

SUMMARY OF INVENTION

The opportunity described above is addressed, in one embodiment of the present invention, by replacing a user interface and a temperature sensing interface with a single temperature limiting user interface comprising: a potentiometer for providing a reference signal to an electronic apparatus, the electronic apparatus being adapted to generate heat as a function of the reference signal; and a temperature-sensitive impedance, thermally coupled to the electronic apparatus so as to receive at least a portion of the heat, and electrically coupled to the potentiometer so as to alter the reference signal as a function of temperature.

BRIEF DESCRIPTION OF DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
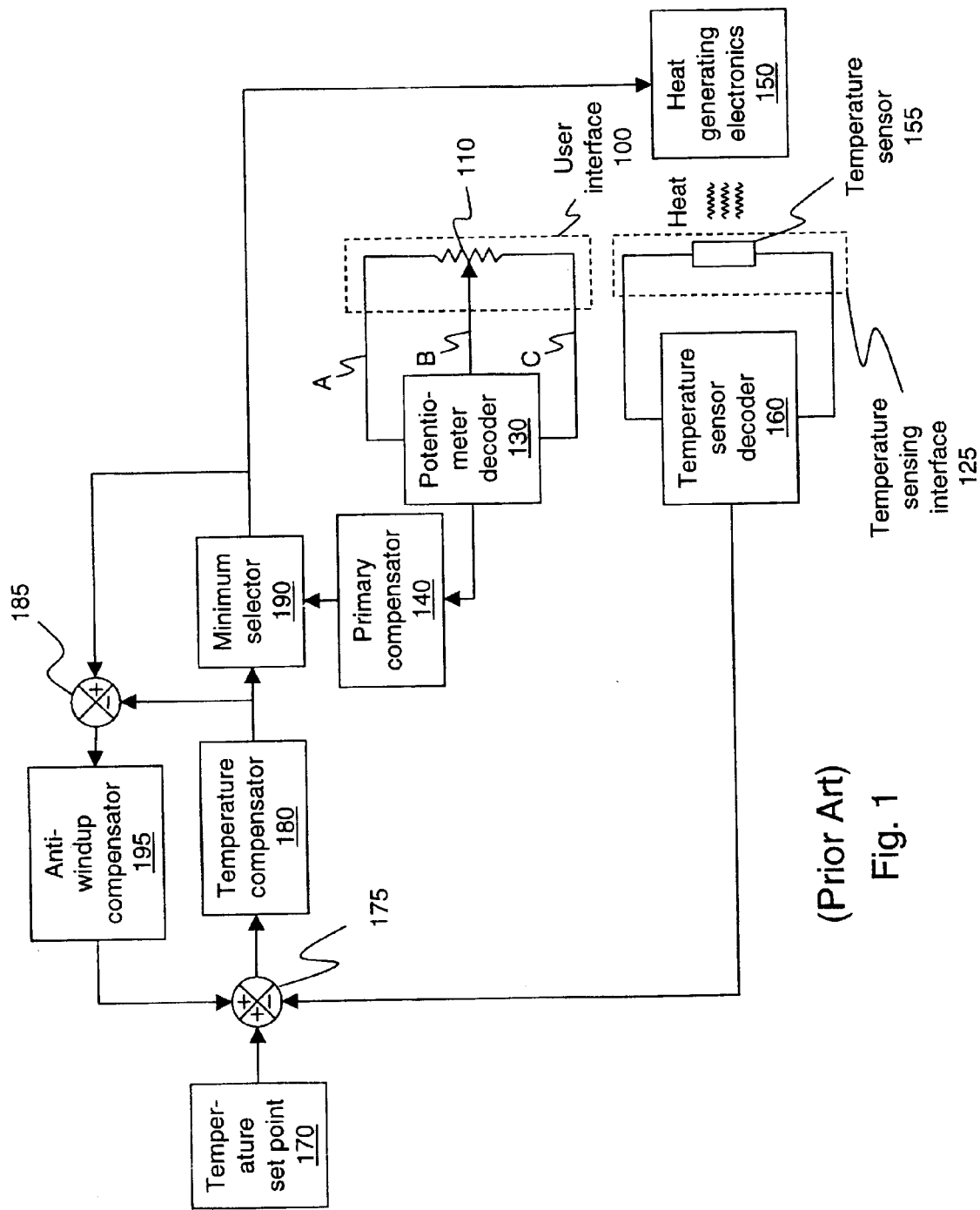
FIG. 1 is a block diagram of an electronic apparatus with conventional temperature limiting.

FIG. 1 is a block diagram of an electronic apparatus with a temperature limiting function using primary, secondary, and tertiary control paths as known in the prior art. A similar apparatus is disclosed in commonly assigned Connolly et al, "Method And Apparatus For Thermal Limiting Of The Temperature Of A Glass-Ceramic Cooktop," U.S. Pat. No. 6,285,012. The electronic apparatus of FIG. 1 comprises: a user interface 100 comprising a potentiometer 110; a potentiometer decoder 130; a primary compensator 140; a minimum selector 190; heat generating electronics 150; a temperature sensing interface 125 comprising a temperature sensor 155; a temperature sensor decoder 160; a temperature set point 170; a temperature summing junction 175; a temperature compensator 180; an anti-windup summing junction 185; and an anti-windup compensator 195.

In the primary control path, a user sets a wiper position of potentiometer 110 to provide a reference signal for the primary function of the electronic apparatus. Potentiometer decoder 130 measures the wiper position to generate a primary set point signal. Any desired dynamic compensation for the primary function is provided by primary compensator 140 which receives the primary set point signal and generates a primary control signal. Minimum selector 190 selects the smaller, in the algebraic sense, of the primary control signal and a secondary control signal to form a selected control signal; when the primary control signal is selected, the electronic apparatus is said to be "in primary mode" and heat generating electronics 150 receives the selected control signal and performs the primary function.

In the secondary control path, temperature sensor 155 manifests an electrical property as a function of temperature. The electrical property is sensed by temperature sensor decoder 160 to generate a temperature feedback signal. Temperature summing junction 175 subtracts the temperature feedback signal from the sum of an anti-windup feedback signal and temperature set point 170 to generate a temperature error signal. Temperature compensator 180 receives the temperature error signal and generates a secondary control signal providing any desired dynamic compensation. When the secondary control signal is selected by minimum selector 190, the electronic apparatus is said to be "in secondary mode" (i.e., temperature limiting mode) and heat generating electronics 150 receives the selected control signal and performs the temperature limiting function.

In the tertiary control path, the secondary control signal is subtracted from the selected control signal by anti-windup summing junction 185 to form an anti-windup error signal. In secondary mode, the anti-windup error signal is identically zero and anti-windup compensator 195 does nothing; in primary mode, however, anti-windup compensator 195 compensates the anti-windup error signal, typically by static gain compensation, to produce the anti-windup feedback signal and stabilize unstable temperature compensator 180.

The temperature limiting scheme exemplified by FIG. 1 has numerous benefits:

the explicit temperature set point 170 provides flexibility in choice of temperature limit; the separate compensators, temperature compensator 180 and primary compensator 140, provide the possibility of having temperature limit dynamics different from primary function dynamics; anti-windup compensator 195 and anti-windup summing junction 185 allow the use of an unstable temperature compensator 180 providing higher performance, in some cases, than alternative stable compensators; and the explicit classical control structure of the secondary mode facilitates analysis and prediction of secondary mode dynamic behavior.

However, in some applications, such as, for example, in some cooking appliances, it is economically advantageous to sacrifice some of the abovementioned benefits in order to reduce the overall cost and complexity of the electronic apparatus. An opportunity exists, therefore, to eliminate the secondary and tertiary control paths by modifying the primary control path to perform both the primary function and the temperature limiting function. This opportunity is addressed, in one embodiment of the present invention, by replacing user interface 100 and temperature sensing interface 125 with a single temperature limiting user interface 200 (FIG. 2).

Figure 2:
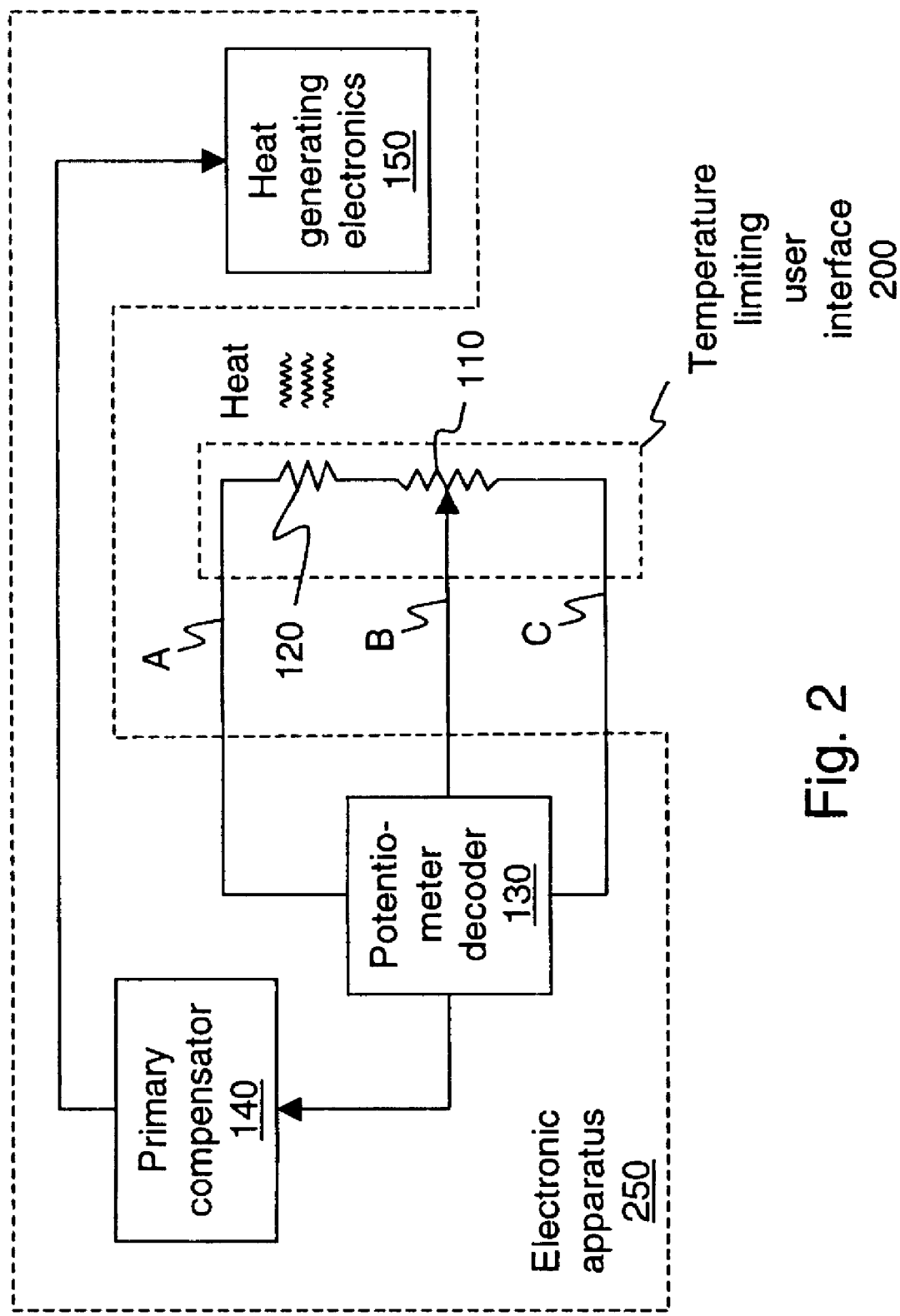
FIG. 2 is a block diagram of an electronic apparatus with a temperature limiting user interface in accordance with one embodiment of the present invention.

In accordance with one embodiment of the present invention, FIG. 2 is a block diagram of an electronic apparatus 250 with a temperature limiting user interface 200 comprising a potentiometer 110 and a temperature-sensitive impedance 120. Potentiometer 110 provides a reference signal to electronic apparatus 250. As a function of the reference signal, electronic apparatus 250 generates heat. Temperature-sensitive impedance 120 is thermally coupled to electronic apparatus 250 so as to receive at least a portion of the generated heat, and electrically coupled to potentiometer 110 so as to alter the reference signal as a function of temperature. By altering the reference signal, a temperature limiting function is performed.

As defined herein, a "potentiometer" is any electrical device comprising at least two potentiometer terminals and a means for changing an electrical impedance between at least two of the potentiometer terminals. "Electrical impedance", as used herein, refers to electrical resistance, electrical reactance, or any combination thereof. In typical embodiments, the impedances manifested by potentiometer 110 are resistances. Examples of potentiometers include, without limitation, wire-wound potentiometers, conductive plastic potentiometers, variable inductors and variable capacitors.

As defined herein, a "temperature-sensitive impedance" is any electrical device comprising at least two terminals wherein the impedance between at least two of the terminals changes as a function of temperature. Examples of temperature-sensitive impedances include, without limitation, semi-conductor thermistors, polymeric positive temperature coefficient devices (PPTCs) and bimetallic switches including, without limitation, bimetallic strips and snap-acting bimetallic discs.

In a more specific embodiment of temperature limiting user interface 200, FIG. 2 shows temperature-sensitive impedance 120 electrically coupled in series with potentiometer 110. As defined herein, an electrical device is said to be "electrically coupled in series with a potentiometer" if exactly one terminal of the electrical device is electrically coupled to at least one potentiometer terminal.

In a still more specific embodiment of temperature limiting user interface 200, FIG. 2 shows temperature-sensitive impedance 120 electrically coupled in series with a body impedance of potentiometer 110. As defined herein, an impedance between two potentiometer terminals is a "body impedance" if the impedance is unaltered by the potentiometer's means of changing an electrical impedance; an electrical device is said to be "electrically coupled in series with a body impedance of a potentiometer" if in operation the device and the body impedance conduct identical currents.

Figure 3:
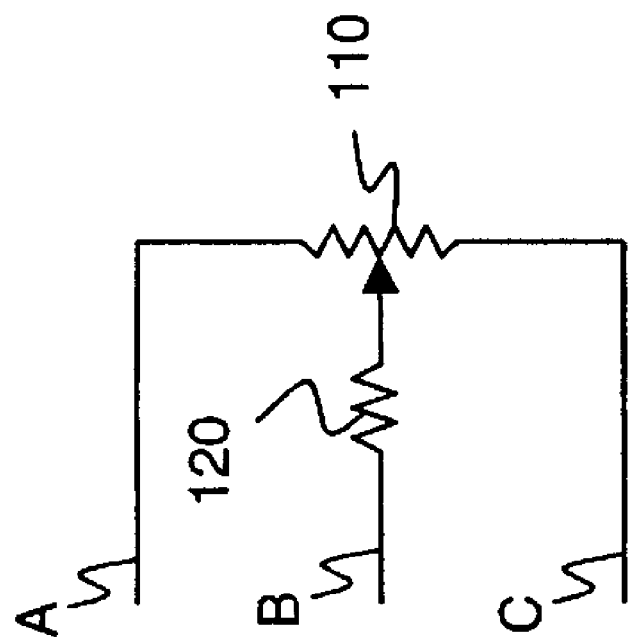
FIG. 3 is a schematic diagram of another embodiment of the present invention in accordance with the embodiment of FIG. 2.

In an alternative embodiment of temperature limiting user interface 200, FIG. 3 shows temperature-sensitive impedance 120 electrically coupled in series with potentiometer 110, and not electrically coupled in series with a body impedance of potentiometer 110.

Figure 4:
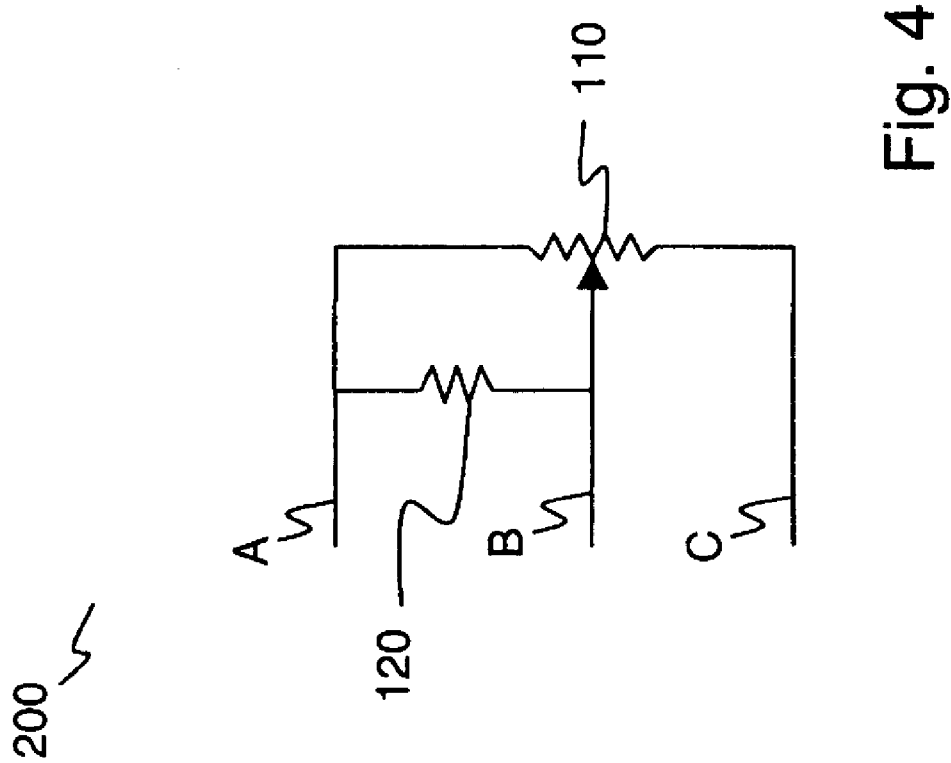
FIG. 4 is a schematic diagram of still another embodiment of the present invention in accordance with the embodiment of FIG. 2.

In another embodiment of temperature limiting user interface 200, FIG. 4 shows temperature-sensitive impedance 120 electrically coupled in parallel with potentiometer 110. As defined herein, an electrical device is said to be "in parallel with a potentiometer" if at least two terminals of the electrical device are coupled to at least two terminals of the potentiometer.

In another more specific embodiment in accordance with the embodiments of FIGS. 2–4, temperature-sensitive impedance 120 comprises a positive temperature coefficient device. As defined herein, a "positive temperature coefficient device" is a temperature-sensitive impedance wherein the impedance between at least two of the terminals is an increasing function of temperature. Examples of positive temperature coefficient devices include, without limitation, PPTCs and appropriately fashioned bimetallic switches.

In another more specific embodiment in accordance with the embodiment of FIG. 2, temperature-sensitive impedance 120 comprises a negative temperature coefficient device. As defined herein, a "negative temperature coefficient device" is a temperature-sensitive impedance wherein the impedance between at least two of the terminals is a decreasing function of temperature. Examples of negative temperature coefficient devices include, without limitation, semi-conductor thermistors and appropriately fashioned bimetallic switches.

The design choice between a positive temperature coefficient device and a negative temperature coefficient device depends on the nature of potentiometer decoder 130, on the nature of the electrical coupling between temperature-sensitive impedance 120 and potentiometer 110, and on whether heat generated by electronic apparatus 250 is an increasing or decreasing function of the potentiometer reference signal.

Figure 5:
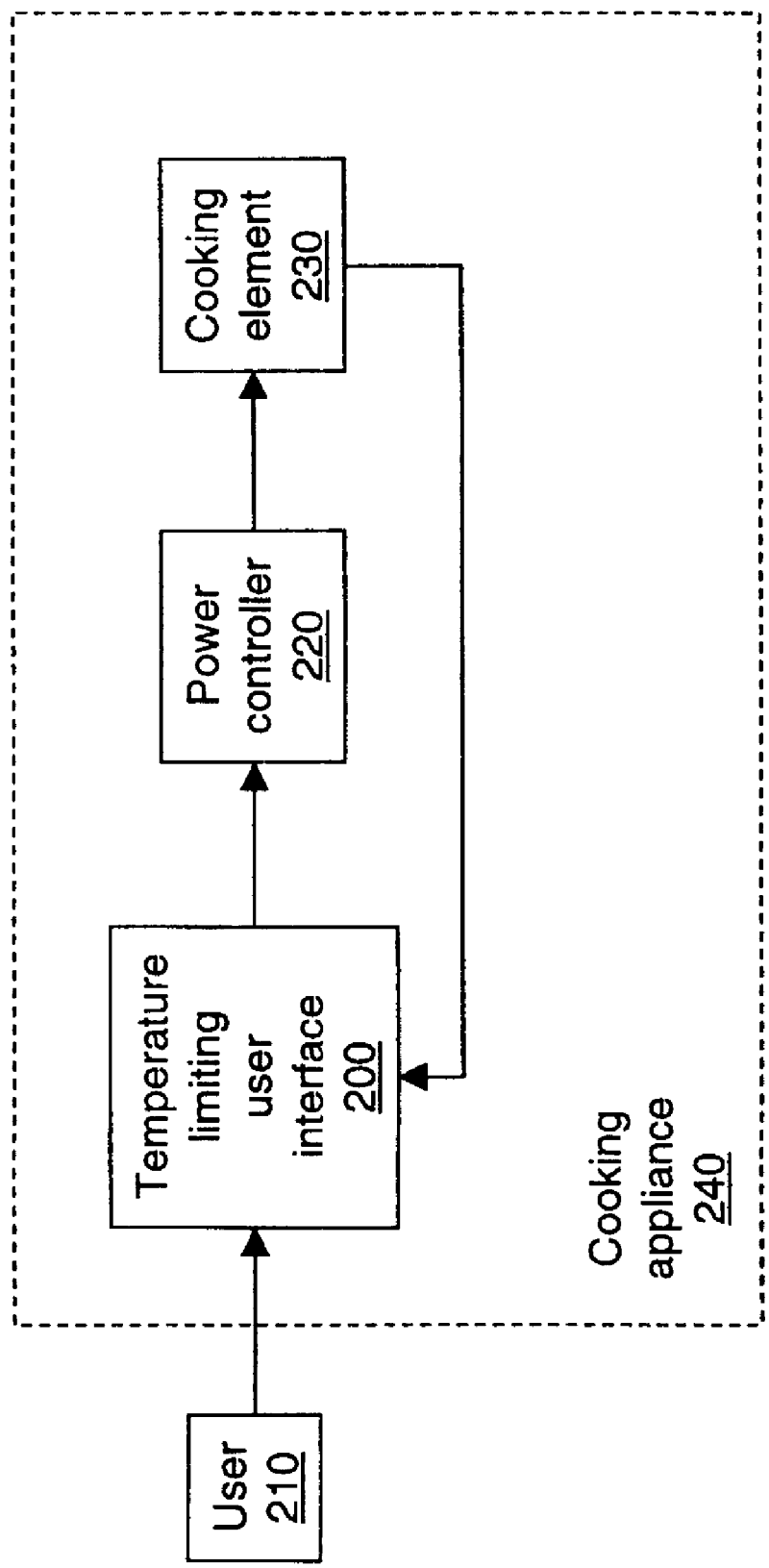
FIG. 5 is a block diagram of a cooking appliance in accordance with another embodiment of the present invention.

In accordance with another embodiment of the present invention, FIG. 5 is a block diagram of a cooking appliance 240 comprising a temperature limiting user interface 200, a power controller 220, and a cooking element 230. Temperature limiting user interface 200 provides a power reference signal to power controller 220. As a function of the reference signal, power controller 220 generates electrical power. From the electrical power, cooking element 230 generates heat for cooking food.

Temperature limiting user interface 200 comprises a potentiometer 110 and a temperature-sensitive impedance 120 (shown in FIGS. 2–4). Potentiometer 110 provides the power reference signal for the primary food cooking function of cooking appliance 240. Temperature-sensitive impedance 120 is thermally coupled to at least one of power controller 220 and cooking element 230, and electrically coupled to potentiometer 110 so as to alter the power reference signal as a function of temperature. Temperature-sensitive impedance 120 receives heat from either power controller 220 or cooking element 230 or both, so that the temperature of temperature-sensitive impedance 120 is representative of a maximum temperature permissible in cooking appliance 240 or its surroundings. By altering the power reference signal as a function of temperature, temperature limiting user interface 200 implements a temperature limiting function.

While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A cooking appliance comprising:
    a temperature limiting user interface adapted to provide a power reference signal;
    a power controller adapted to generate electrical power as a function of the power reference signal; and
    a cooking element for generating heat from the electrical power,
    said temperature limiting user interface comprising:
        a potentiometer adapted to provide the power reference signal; and
        a temperature-sensitive impedance thermally coupled to said cooking element and electrically coupled to said potentiometer so as to alter the power reference signal as a function of temperature.

2. The cooking appliance of claim 1 wherein said temperature-sensitive impedance is electrically coupled in series with said potentiometer.

3. The cooking appliance of claim 2 wherein said temperature-sensitive impedance is electrically coupled in series with a body impedance of said potentiometer.

4. The cooking appliance of claim 1 wherein said temperature-sensitive impedance is electrically coupled in parallel with said potentiometer.

5. The cooking appliance of claim 1 wherein said temperature-sensitive impedance comprises a positive temperature coefficient device.

6. The cooking appliance of claim 1 wherein said temperature-sensitive impedance comprises a negative temperature coefficient device.

7. A cooking appliance comprising:
    a temperature limiting user interface adapted to provide a power reference signal;
    a power controller adapted to generate electrical power as a function of the power reference signal; and
    a cooking element for generating heat from the electrical power,
    said temperature limiting user interface comprising:
        a potentiometer adapted to provide the power reference signal; and
        a positive temperature coefficient device thermally coupled to said cooking element and electrically coupled to said potentiometer so as to alter the power reference signal as a function of temperature.

8. The cooking appliance of claim 7 wherein said positive temperature coefficient device is electrically coupled in series with said potentiometer.

9. The cooking appliance of claim 8 wherein said positive temperature coefficient device is electrically coupled in series with a body impedance of said potentiometer.

10. The cooking appliance of claim 7 wherein said positive temperature coefficient device is electrically coupled in parallel with said potentiometer.

* * * * *